United States Patent
Tanahashi

(12) 
(10) Patent No.: US 6,233,785 B1
(45) Date of Patent: May 22, 2001

(54) TORQUE HINGE MECHANISM

(75) Inventor: Kosei Tanahashi, Fujisawa (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/329,437

(22) Filed: Jun. 10, 1999

(30) Foreign Application Priority Data

Jul. 24, 1998 (JP) .................................................. 10-209014

(51) Int. Cl.[7] ..................................................... E05D 11/08
(52) U.S. Cl. ................................ 16/337; 16/342; 16/343; 16/278; 16/273
(58) Field of Search ..................................... 361/680, 681; 16/277, 337, 342, 343, 278, 273

(56) References Cited

U.S. PATENT DOCUMENTS

| 5,208,944 | * | 5/1993 | Lu | 16/278 |
| 5,970,580 | * | 10/1999 | Katoh | 16/337 |
| 6,038,739 | * | 3/2000 | Katoh | 16/342 |
| 6,081,969 | * | 7/2000 | Tanahashni et al. | 16/337 |

FOREIGN PATENT DOCUMENTS

| 7-8642 | 2/1995 | (JP) . |
| 7-43672 | 9/1995 | (JP) . |
| 9-60397 | 4/1997 | (JP) . |

\* cited by examiner

*Primary Examiner*—Chuck Y. Mah
*Assistant Examiner*—Enoch E Peavey
(74) *Attorney, Agent, or Firm*—Anthony N. Magistrale; J Bruce Schelkopf

(57) ABSTRACT

Described is a torque hinge mechanism which includes a shaft and at least two ring like friction plates pressed against each other by a pressure and through which the shaft passes. A non-penetrating recess is formed on a friction surface of one of the ring like friction plates. The non-penetrating recess can be a closed type non-penetrating recess. A scatter of a lubricant can be prevented by using such friction plates. A wedge effect is increased by using such friction plates so that the torque hinge mechanism can be stably operated over a long period of time.

12 Claims, 8 Drawing Sheets

OIL FILM IS FORMED BY A HIGH PRESSURE DUE TO A WEDGE EFFECT

TORQUE HINGE MECHANISM

BACKGROUND OF THE INVENTION

1. Field of the Invention

The present invention relates to a torque hinge mechanism used for coupling a main body with an open/close member which is moved to an opened position or a closed position, and an apparatus including such torque hinge mechanism, such as a portable type information processing system.

2. Description of Related Art

FIG. 1 shows a model of a friction plate type torque hinge mechanism. Apertures 3 and 5 are formed in a friction plate 2 and a friction plate 4, and a shaft 6 is fitted into the apertures 3 and 5. The friction plate type torque hinge mechanism utilizes a frictional resistance generated between the two friction plates 2 and 4 for operating as a mechanism which couples a main body with an open/close member to cause plural open/close movements of the member to be possible and to stably maintain the open/close member at any angle to the main body. The mechanism using the two friction plates has been widely used along with another type of hinge mechanism, such as a hinge mechanism using a combination of a cylindrical bearing and a shaft. The use of a lubricant between the two friction plates has also been widely used to realize a smooth rotation by reducing the frictional resistance and to reduce abrasion of the friction plates.

It is required in the torque hinge mechanism that a torque at a static condition, called a static torque, and a torque at the rotational operation, called a dynamic torque, should be maintained within a predetermined range, and these torques are not changed over tens of thousands of open/close operations. These torques, however, cannot be kept at a constant level. For example, during use over a large number of open/close operations, the torque increases due to the decrease of the lubricant. In addition, the torque decreases due to the increase of a space between the friction plates caused by the abrasion of the surfaces of the friction plates, resulting in a generation of an undesired sound and a break of the rotated parts, so that a maintenance service is required. Sometimes, the trouble of the torque hinge mechanism causes a change of a gap between two glass substrates, in which a liquid crystal layer is held, of a liquid crystal display device attached to the torque hinge mechanism, resulting in an irregular display image.

In the portable type electric/electronic apparatus, such as a video camera, a notebook type personal computer, miniaturization and high reliability are required. It has been required in the portable type information processing apparatus to use parts formed as small as possible in the torque hinge mechanism to increase the portability. Since a large number of parts of the torque hinge mechanism are assembled in a small space in the main body and the open/close member, it is impossible to replace only the torque hinge mechanism at its defect. Accordingly, the entire liquid crystal display device including the defective torque hinge mechanism must be replaced. For the above reasons, a torque hinge mechanism with high reliability is required.

FIGS. 2 and 3 show the friction plate used in the prior friction plate type torque hinge mechanism. A lubricant holding mechanism, which includes a small aperture 10 passing or penetrating through the friction plate 9, as shown in FIG. 2, cutout portions (not shown) and a wave shaped surface 12 of the friction plate 9, as shown in FIG. 3, have been frequently used to supply the lubricant to the friction surfaces over a long period of time. It has been difficult to keep the required constant torque over the life time of the product without maintenance service. The inventor of the present invention has found that the cause of the trouble is a shortage of the lubricant since the lubricant cannot be consistently and stably supplied and cannot be stably held during the use over a long period of time. The inventor has also found that the shortage of the lubricant remarkably occurs when a high pressure is applied to the surface of the portions generating the friction. Since these lubricant holding mechanisms lead to a surface opposing the friction surface through a path, such as the lubricant holding mechanism itself or the aperture receiving the shaft, the lubricant held in the lubricant holding mechanism is pushed out to the opposite surface through the path at the application of the high pressure to the surface of the portion generating the friction, whereby an amount of lubricant held in the lubricant holding mechanism is decreased, so that the lubricant cannot be stably supplied.

Japanese Published Unexamined Patent Application 10-26128 discloses a mechanism in which a reservoir of grease is provided by forming small apertures or cutout portions in a friction plate.

Japanese Published Unexamined Patent Application 9-41781 discloses a frictional lock type hinge mechanism without using grease in which a shaft is fitted into an inside surface of a bush, a plurality of grooves extend along an axis of the shaft or a plurality of sprinkled fine recesses are formed on an inner surface of the bush or an outer surface of the shaft.

Japanese Published Unexamined Utility Model Application 8-1404 discloses a tilt hinge for an office automation apparatus in which a lubricant is applied between a friction washer and a spring washer.

Japanese Published Unexamined Utility Model Applications 6-45110 and 6-45111 disclose a mechanism in which at least one of a friction plate and a washer is made of a sintered oilless metal or a resin, such as Teflon.

OBJECTS OF THE INVENTION

It is an object of the present invention to provide a torque hinge mechanism which can be smoothly operated, stably fixed at any angle and can hold the lubricant over a long period of time.

It is another object of the present invention to provide a torque hinge mechanism in which the lubricant is rapidly supplied to keep the abrasion of the friction surface to a minimum.

It is another object of the present invention to provide a torque hinge mechanism in which the lubricant is rapidly supplied to a wide area of the friction plate to decrease the pressure onto the surface of the friction plate to a level for realizing the required torque, to keep the abrasion of the friction surface to a minimum.

It is another object of the present invention to provide an apparatus including a torque hinge mechanism in which the lubricant can be stably held over a long period of time even if the mechanism is miniaturized.

SUMMARY OF THE INVENTION

The present invention is directed to a torque hinge mechanism which includes a shaft and at least two ring like friction plates pressed against each other by a pressure and through which the shaft passes. A non-penetrating recess is formed on a friction surface of one of the two ring like friction plates. A lubricant is disposed between the two ring like friction plates. The non-penetrating recess can be, for example, a closed type non-penetrating recess with an inclined surface.

Another embodiment of the present invention is directed to an apparatus having a torque hinge mechanism. The apparatus includes a main body, an open/close member and at least two torque hinge mechanisms for coupling the main body with the open/close member. The torque hinge mechanisms include a shaft and at least two ring like friction plates pressed against each other by a pressure and through which the shaft passes. A lubricant is disposed between the two ring like friction plates. A non-penetrating recess is formed on a friction surface of one of the two ring like friction plates. The apparatus can be, for example, a notebook type computer while the open/close member can be its display.

DETAILED DESCRIPTION OF THE INVENTION

Figure 4:
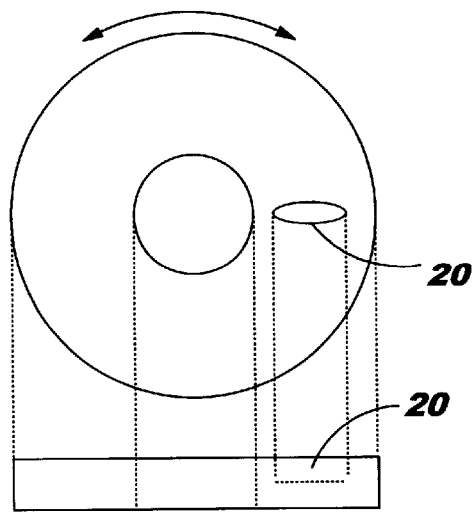
FIG. 4 shows the plan view and the cross sectional view of the friction plate used in accordance with the present invention.

FIG. 4 shows the friction plate of the torque hinge mechanism of the present invention in which a non-penetrating recess or a blind hole 20 is formed on the friction surface of the friction plate. The recess is filled with the lubricant. Since the recess does not penetrate through the friction plate, the lubricant is not pushed out to the opposite surface to the friction surface even if the high pressure is applied to the surface of the friction plate. The term "penetrating recess" in the specification includes the case that the recess itself penetrates through the friction plate, or the case that the recess is coupled to the aperture for receiving the shaft and the lubricant held in the recess flows to the opposite surface through the aperture. In the present invention, the lubricant is applied on the friction surfaces at the sliding operation due to a difference in inside pressure. At the stationary state, the lubricant returns to the lubricant holding mechanism due to a negative pressure generated in the lubricant holding mechanism, so that the lubricant vanishes from the friction surfaces. Even if the open/close operation is repeated, a scatter of the lubricant is quite small, so that the stability of the torque over a long period of time can be guaranteed.

Figure 5:
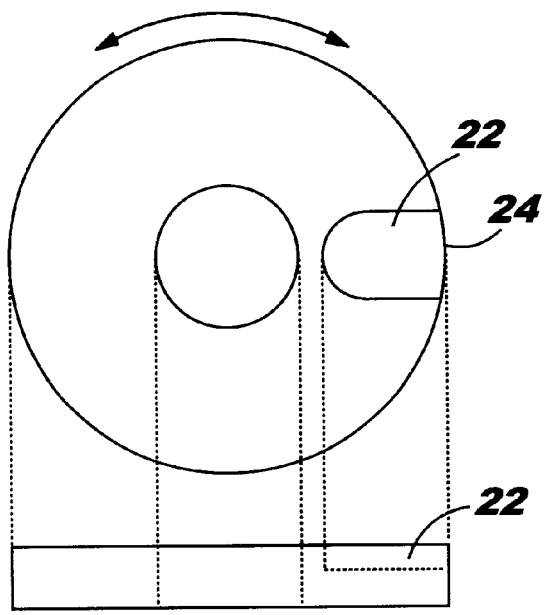
FIG. 5 shows the plan view and the cross sectional view of the friction plate used in accordance with the present invention.

FIG. 5 shows the friction plate in accordance with the present invention in which the non-penetrating recess 22 reaches an outer peripheral portion 24 of the friction plate. The non-penetrating recess includes the closed type recess 20 which does not reach the outer peripheral portion of the friction plate, as shown in FIG. 4, and the opened type recess 22 which reaches the outer peripheral portion 24 of the friction plate, as shown in FIG. 5. Since the pressure applied in a radial direction which is parallel to the surface of the friction plate is smaller than a pressure applied in a vertical direction to the surface of the friction plate, and a space between the two friction plates is very narrow, the push out of the lubricant toward an external atmosphere can be prevented due to a capillary action. Accordingly, it is possible to maintain the stability of the torque over a long period of time even if the recess reaches the outer peripheral portion of the friction plate. In the case, however, that a lubricant of a very low viscosity or a volatile type lubricant is used, the lubricant may be scattered from the outer peripheral portion in the condition that the pressure onto the surface is extremely high; and hence it is desirable to use a lubricant of a high viscosity in these cases.

Figure 6:
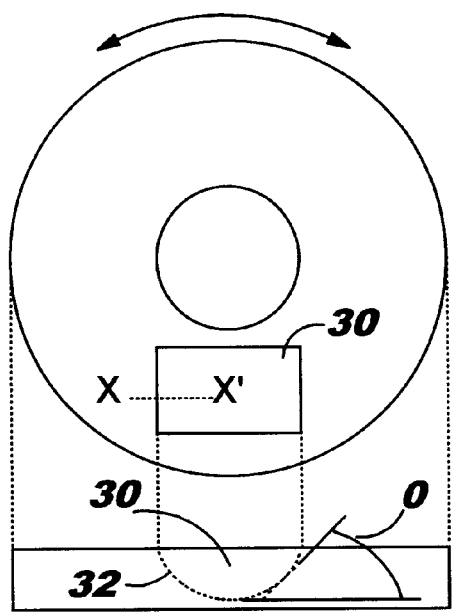
FIG. 6 shows the plan view and the cross sectional view of the friction plate used in accordance with the present invention.
Figure 7:
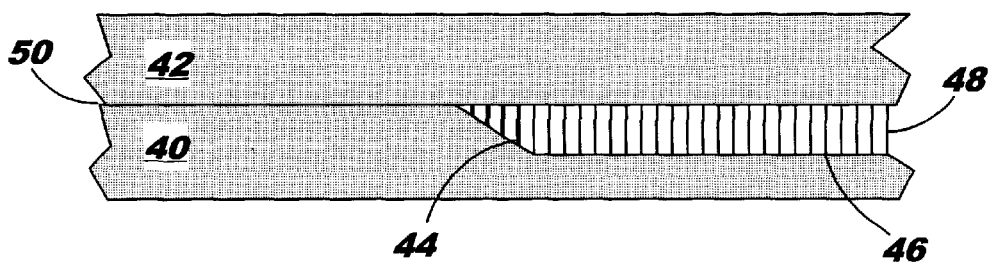
FIG. 7 shows the cross sectional view of the friction plate used in accordance with the present invention.
Figure 8:
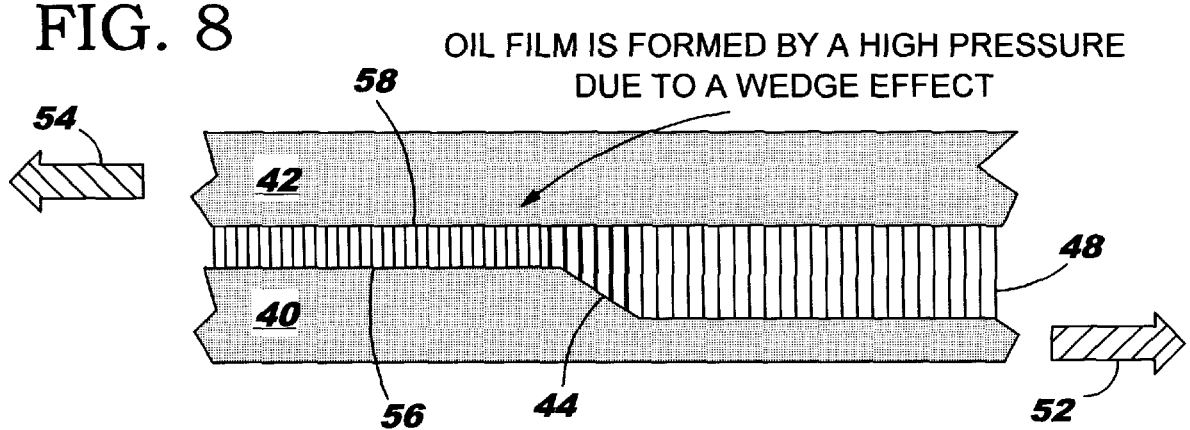
FIG. 8 shows the cross sectional view of the friction plate used in accordance with the present invention.

FIG. 6 shows the friction plate of the present invention in which the side walls 32 of the non-penetrating type recess 30 is slanted. The term "slant" means that an angle θ between the side wall and the direction parallel to the surface of the friction plate, as shown in FIG. 6, is larger than zero degrees and smaller than 90 degrees. It is preferable that the slant is provided on the side walls near the vertical direction to a sliding direction. FIG. 7 shows a cross section along a line X–X' in FIG. 6. The non-penetrating recess 46 is formed on the lower friction plate 40. The lubricant 48 is held in the non-penetrating recess 46 between the friction plate 40 and 42. The surfaces of the friction plates 40 and 42 other than the non-penetrating recess 46 are contacted as shown by the friction surfaces 50. FIG. 8 shows the X–X' cross section in FIG. 6 during an initial time period of the rotation. The friction plate 40 rotates in the rotating direction 52, and the friction plate 42 rotates in the rotating direction 54. The pressure to the lubricant 48 is gradually increased at the slanted side walls 44, so that a film of the lubricant of the high pressure is formed between the friction surface 56 and the friction surface 58. Such phenomenon for increasing the pressure to the lubricant by using the slanted side walls is called a wedge effect.

The lubricant of the high pressure caused by the wedge effect can instantaneously spread over the entire friction surfaces, and this movement of the lubricant is quite desirable in the following two points. First, the lubricant can be spread over the entire surface of the friction surfaces immediately after the start of the operation, so that a value of the initial torque can be decreased, resulting that a difference between the initial torque and the dynamic torque becomes small, whereby a feeling in the open/close operation to the user becomes quite smooth. Without using the present invention, the initial torque can be one and a half times as much as the dynamic torque. Since the initial torque which is the largest torque can be decreased, the design of the strength of a housing receiving the torque hinge mechanism becomes quite easy. Conversely, in the case that the difference between the initial torque and the dynamic torque is large, the open/close operation is suddenly initiated when the force applied by the user reaches a relatively large value, and the friction becomes small once the movement is started, so that the movement becomes large, resulting in an unnatural feeling to the user in the open/close operation. Also, since a certain strength of the housing is required, the miniaturization and lightening of the housing becomes difficult. Second, it is possible to keep the abrasion of the metal to a minimum since the supply of the lubricant can be made rapidly. Although the smaller the angle θ is, the higher is the wedge effect, the contact area of the friction plates is decreased, so that the efficiency of generating the torque is decreased. The preferable inclination of the side walls to the present invention is obtained when the angle θ is 15–85 degrees, preferably 45–85 degrees, more preferably 60–80 degrees.

Figure 9:
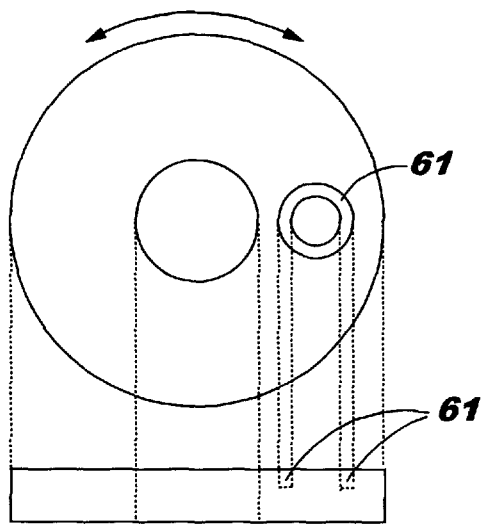
FIG. 9 shows the plan view and the cross sectional view of the friction plate used in accordance with the present invention.

The shape of the non-penetrating recess for increasing the wedge effect to a maximum is the closed type non-penetrating recess, as shown in FIGS. 4 and 6. When the pressure is applied to the lubricant held in the recess, the smooth distribution of the lubricant can be obtained in the case that the pressure is locally concentrated to the surface of the side wall. Such concentration of the pressure can be easily realized in the closed type recess. The recess shown in FIGS. 4 and 6 is the perfectly closed recess in which the material in the inside portion of the recess is perfectly removed, and such recess is particularly preferable. FIG. 9 shows a shape of an imperfectly closed type non-penetrating recess. In the imperfectly closed non-penetrating recess, the material in the center portion of the recess is left in a shape of an island. Although the imperfectly closed type recess has substantially the same function as that of the perfectly closed type recess in the operation for preventing the lubricant from being scattered, the perfectly closed type recess is better in the point of the wedge effect. In a groove like non-penetrating recess 61 of the imperfectly closed type recess, the flow of the lubricant tends to occur since the pressure at a point near to the center differs from the pressure at a point near to the outer peripheral portion. When the flow of the lubricant becomes large, the wedge effect becomes insufficient so that the difference between the initial torque and the dynamic torque becomes large.

Summarizing the various shapes of the recess for holding the lubricant, the recess of the non-penetrating type prevents the lubricant from being scattered. The non-penetrating type recesses are classified into a closed type and an opened type, the larger wedge effect is obtained in the closed type. The closed type recesses are classified into the perfectly closed type recess and the imperfectly closed type recess. It has been found that the larger wedge effect is obtained in the perfectly closed type recess. In either case, it is possible to increase the wedge effect by providing the inclination on the side wall surfaces.

Figure 10:
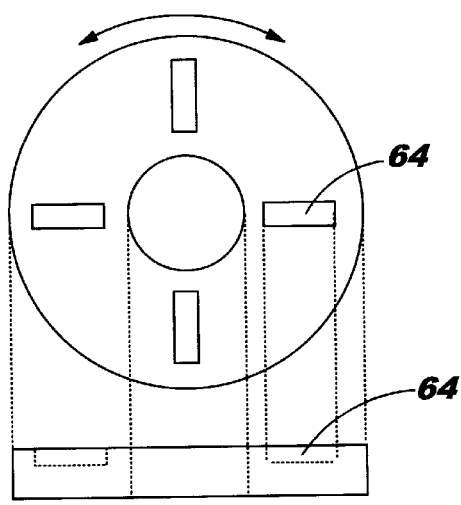
FIG. 10 shows the plan view and the cross sectional view of the friction plate used in accordance with the present invention.

FIG. 10 shows an example of the friction plate having the elongated shape non-penetrating recesses with a long axis extending along a radial direction provided at four places. The friction plate provided with such recesses can uniformly supply the lubricant in the radial direction. As the number of recesses is increased, the lubricant can be quickly supplied over the entire friction surface. However, as the ratio of the area occupied by the recesses to the entire area of the friction surface becomes large, the efficiency for generating the torque is decreased. When the efficiency for generating the torque is decreased, it is necessary to increase the pressure onto the surfaces for contacting the friction surfaces to each other, so that the problem, such as the increase of the abrasion of the friction surfaces and the difficulty of the miniaturization of the friction plates is caused.

To efficiently distribute the lubricant over the entire friction surface while keeping the ratio of the area occupied by the recesses to the entire area of the friction plate to a minimum, it is desirable to use the recess of the elongated shape with the long axis extending along the radial direction. It has been found that the lubricant held in the recesses with a long axis extending along a circumference direction does not contribute to the improvement of the lubricating function. The number of places on the friction surface on which the recesses with the long axis extending along the radial direction are formed is preferably 2–32 places, more preferably 4–16 places. The percentage of the area occupied by the recesses to the entire surface area of the friction plate is 1–50%, preferably 5–40%, more preferably 10–35%.

Although the shape of the non-penetrating recess with the long axis extending along the radial direction is not particularly defined, such recess may be used such that the shape near the outer peripheral side of the ring like friction plate is substantially the same as the shape near the inner peripheral side. In other words, the shape near the outer peripheral side is symmetrical to the shape near the inner peripheral side. The use of the non-penetrating recess with such symmetry can realize the uniform distribution of the lubricant over the entire friction surface.

Figure 11:
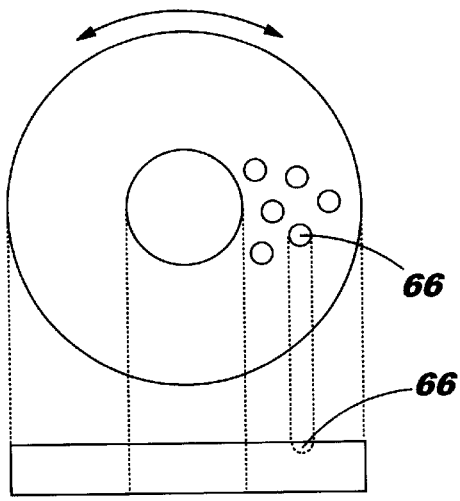
FIG. 11 shows the plan view and the cross sectional view of the friction plate used in accordance with the present invention.

FIG. 11 shows an example of the friction plate on which a plurality of hemisphere like recesses are formed. The friction plate can very quickly supply the lubricant of uniform thickness to the entire friction surface.

The present invention can be used for various purposes. The present invention is particularly useful for the torque hinge mechanism using the small size friction plates. Even if the small size friction plates are used, the torque hinge mechanism of the present invention can operate without the maintenance service, its torque is stable, and can realize the maintenance free operation over tens of thousands of open/close operations. It is most preferable to apply the present invention to the friction plate of the diameter of 2–30 mm, particularly 3–15 mm, and more particularly 4–12 mm.

The deep recess causes the friction plate to bend, and the shallow recess causes powder generated by the abrasion to accumulate in the recess. Therefore, it is necessary for the recess to have an appropriate deepness. In the case that the diameter of the friction plate is 8 mm, the diameter of the aperture receiving the shaft is 4 mm, and the thickness of the plate is 1.2 mm, the preferable deepness of the recess is 0.3–0.7 mm.

The non-penetrating recesses can be formed on only one friction plate or both friction plates. In the case that the recesses are formed on both friction plates, a variation of the torque may be produced during the sliding operation due to the relative positional relationship of the recesses on both friction plates. Accordingly, it is preferable to form the non-penetrating recesses on one of the friction plates to precisely keep the torque in the rotational operation to a constant value.

Although the case using the two friction plates has been described as an example, more than two friction plates can be used in the torque hinge mechanism. In the case that three friction plates are used, the penetrating recesses can be provided on one of the three friction plates, can be provided on the two friction plates, or can be provided on both surfaces of the middle friction plate.

The material used for the friction plate is required to have a low friction coefficient and a low damage to the friction surface, which are contrary to each other, in addition to a characteristic for forming the structural plate. The material which can be generally used are cast iron, gun metal, brass, phosphor bronze, aluminum alloy, copper lead alloy, tin based white metal, lead based white metal, cadmium alloy, cadmium alloy, lead copper, lead bronze, etc. Particularly desirable materials are phosphor bronze, stainless (SUS304, etc.), iron (SK material), etc. Double layers or triple layers of these materials can be used. Further, although a material immersed with a lubricant of porous material, such as sintered oilless alloy or resin, may be used, a careful selection of the material is required since the torque is varied in some materials.

In selecting a combination of the material used for the two friction plates, the friction surfaces of which slide against each other, it is preferable to select two materials which are not molten when they contact each other. A combination of a hard material and a soft material is used to minimize the abrasion of the metal and to improve the touch in the open/close operation. The preferred result can be obtained by using a combination of stainless and phosphor bronze.

The lubricant broadly used in the art can be used as the lubricant in the present invention. The lubricant can be classified into a lubrication oil, a grease and a solid lubricant. The solid lubricant is particularly preferable in view of the stability of the torque over a long period of time. The example of the lubricant in the market place is a white solid lubricant (Solvent white paste SPX-20 of STT Corp).

Figure 12:
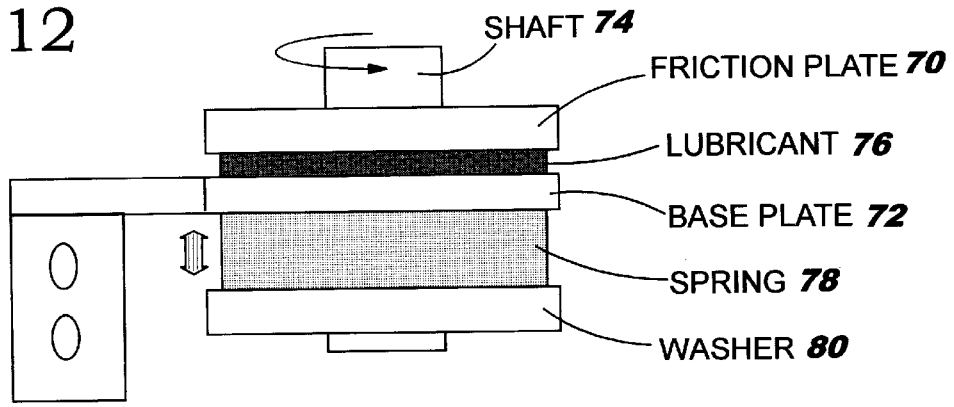
FIG. 12 shows a structure of the friction type torque hinge mechanism in accordance with the present invention.

FIG. 12 shows a structure of the torque hinge mechanism in accordance with the present invention. A friction plate 70 and a shaft 74 are integrally formed, and the shaft 74 passes through an aperture of a base plate 72 which is the other friction plate. A lubricant 76 is held between the friction plate 70 and the base plate 72. The torque is generated by the friction between the friction plate 70 and the base plate 72 pressed to each other by a pressure which is applied by a washer 80 and a spring 78. In the case of the notebook type personal computer, one of the shaft 74 and the base plate 72 is coupled to the display device, and the other is coupled to the main body.

Figure 17:
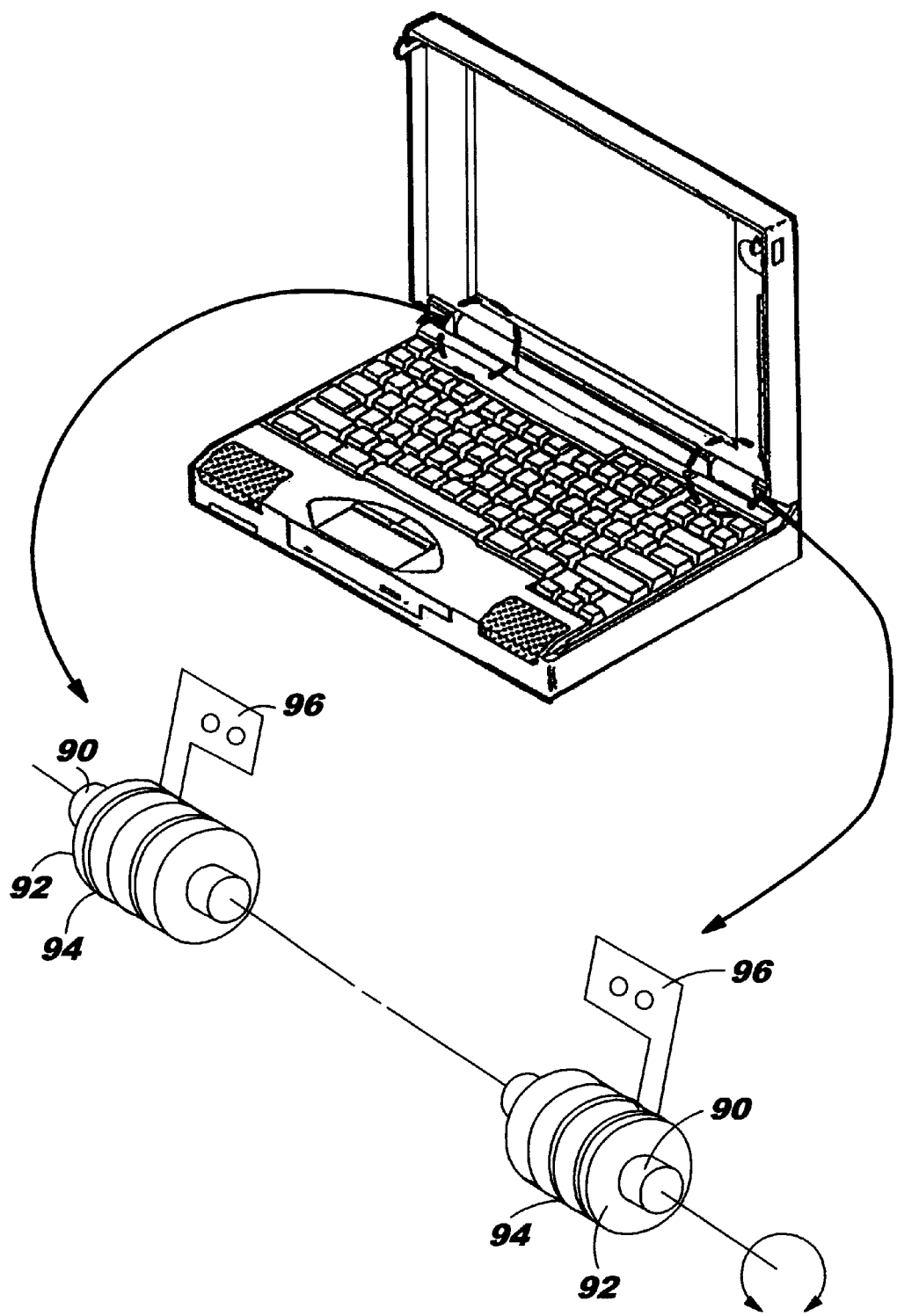
FIG. 17 shows the apparatus including the torque hinge mechanism of the present invention.

FIG. 17 shows an example of the notebook type personal computer, as the portable type information processing apparatus in which the torque hinge mechanism of the present invention is mounted. In this example, a shaft 90 integral with a friction plate 92 is coupled to a keyboard which is the main body, and a base 96 integral with a base plate 94, which is the other friction plate, is coupled to a liquid crystal display device, which is the open/close member.

The present invention can be broadly used in apparatuses including the friction type torque hinge mechanism. More particularly, the present invention can be used in a structure including a large open/close member, such as in a copying machine, furniture mounted below a floor, a toilet seat, a door of a house, a door of a car, etc. A massive feeling and a smooth operational feeling of a certain degree can be obtained by using the torque hinge mechanism of the present invention in the above structures. The usage of the present invention in the portable type information processing apparatus is particularly useful. Although it is required in the portable type information processing apparatus to realize the maintenance free operation over tens of thousands of open/close operations, such maintenance free operation of the present invention cannot be realized by prior technologies. Examples of portable type information processing devices which can be used with the present invention include a video camera, a portable type telephone, an electronic pocket notebook, a pocket computer, a notebook type computer, etc.

In the case that the torque hinge mechanism of the present invention is used in the notebook type computer, the present invention has such merit by using an electrically conductive material as the material of the parts of the torque hinge mechanism that the torque hinge mechanism of the present invention can be used as an electrically conductive part for preventing an electromagnetic interference (EMI). In the notebook type computer, the main body and the display portion are connected by a cable, and, as the frequency becomes higher and higher, the same voltage potential level cannot be obtained at both the main body and display portion, so that the main body and the display portion operate as an antenna to exert an electromagnetic influence on another electronic apparatus. Since a size of the notebook type computer is large in comparison with another portable type information processing apparatus, the notebook type computer is susceptible to the influence of the EMI. The torque hinge mechanism of the present invention which is electrically conductive, is used to couple the main body and the display portion, each of which is made of the electrically conductive material, such as the electrically conductive metal or plastic material, a surface of which is plated by the electrically conductive metal, so that both the main body and display portion connected by the electrically conductive torque hinge mechanism can be kept at the same potential level.

Figure 1:
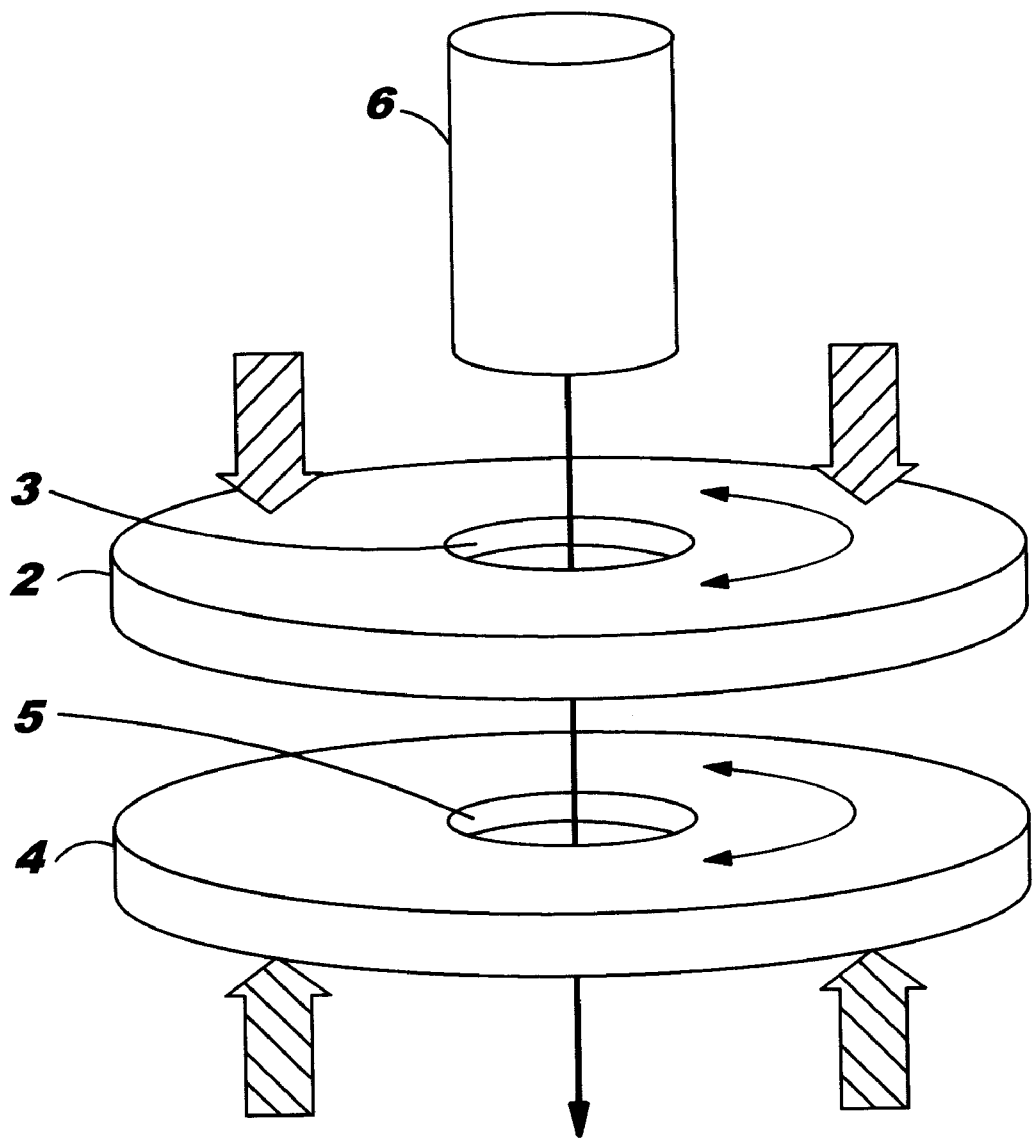
FIG. 1 shows a conventional friction plate type torque hinge mechanism.
Figure 2:
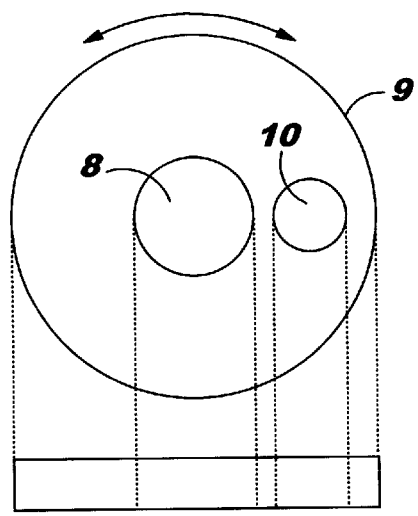
FIG. 2 shows the plan view and the cross sectional view of the friction plate used in the conventional friction plate type torque hinge mechanism.
Figure 3:
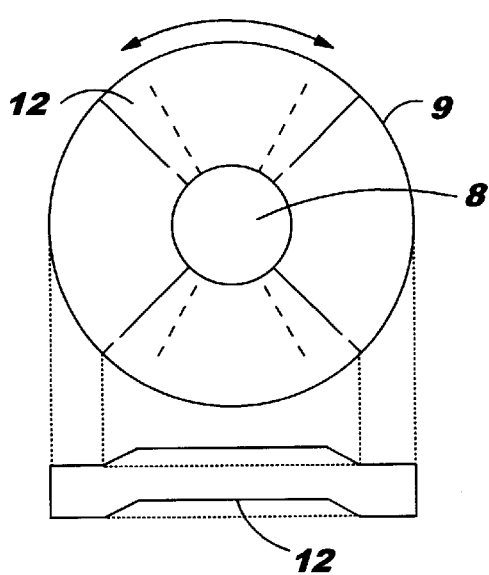
FIG. 3 shows the plan view and the cross sectional view of the friction plate used in the conventional friction plate type torque hinge mechanism.
Figure 13:
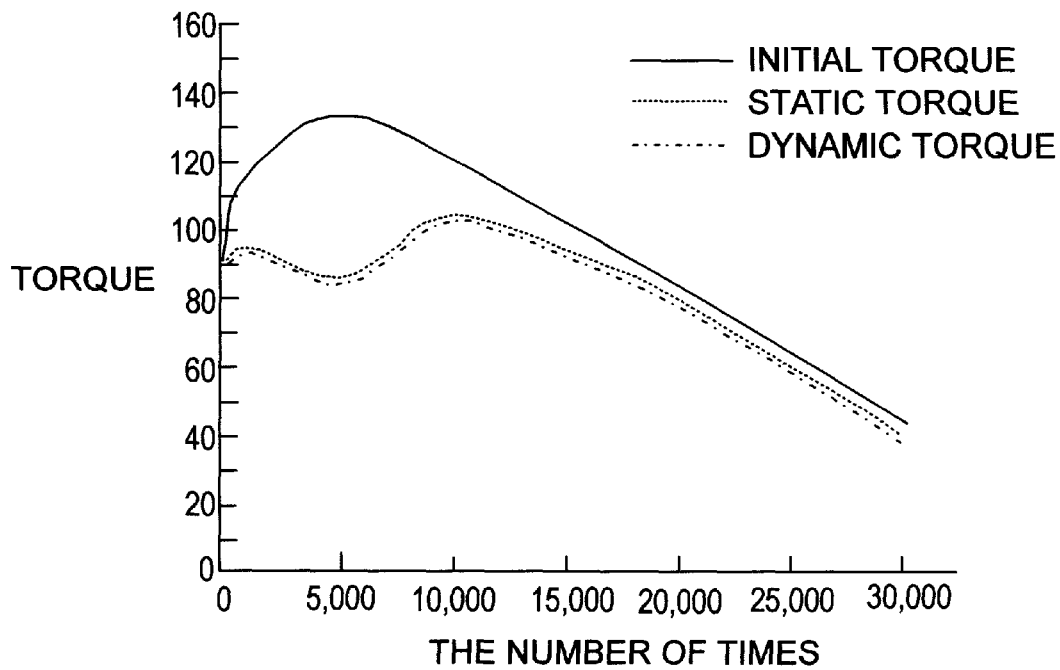
FIG. 13 shows a graph showing the variation of the torque in the prior technology.
Figure 14:
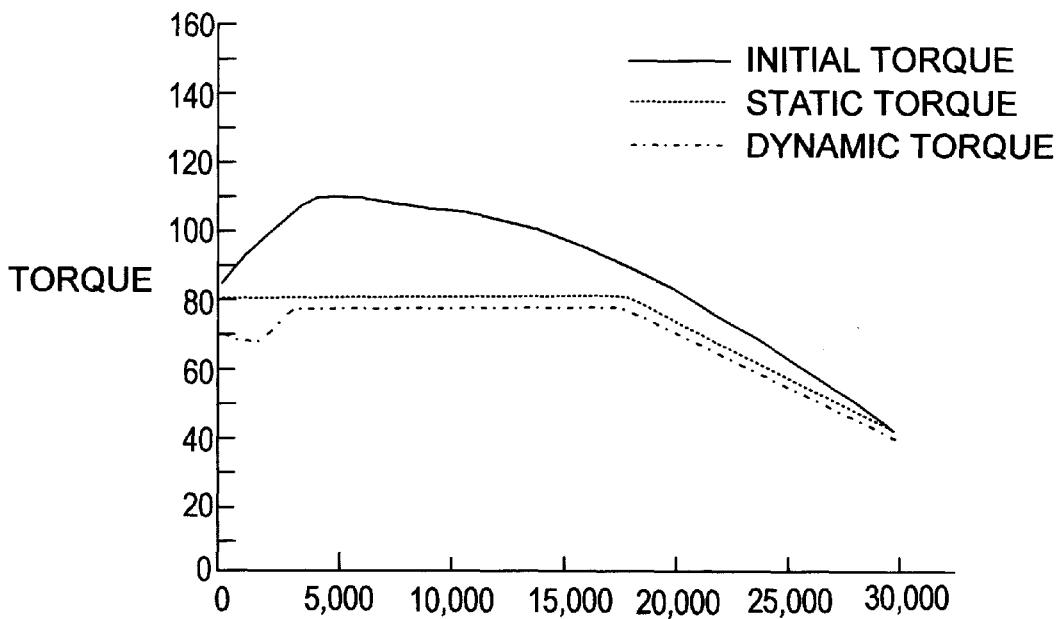
FIG. 14 shows a graph showing the variation of the torque in the prior technology.
Figure 15:
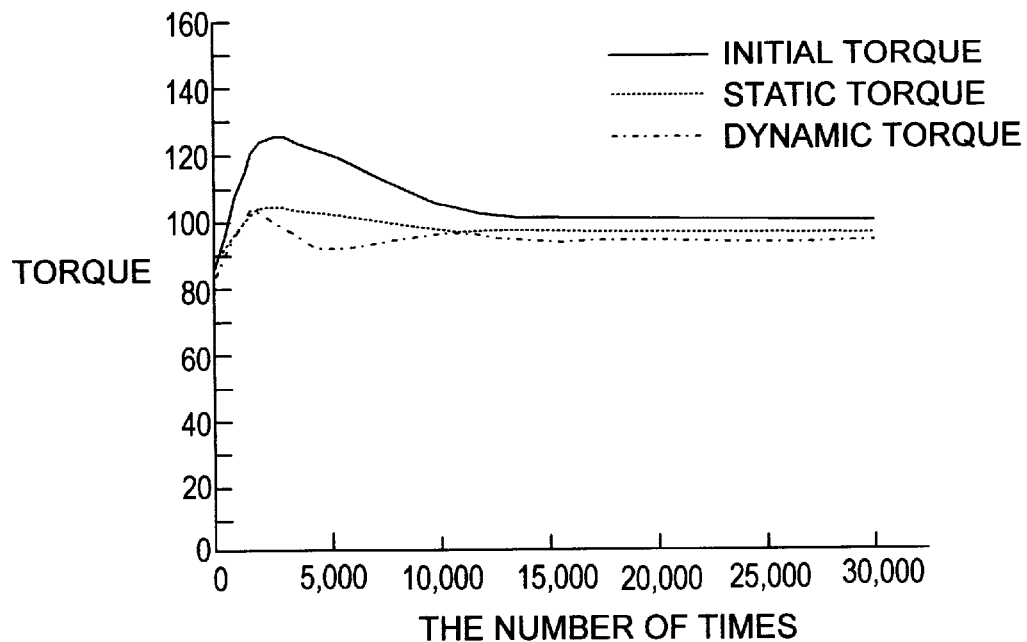
FIG. 15 shows a graph showing the variation of the torque in the present invention.
Figure 16:
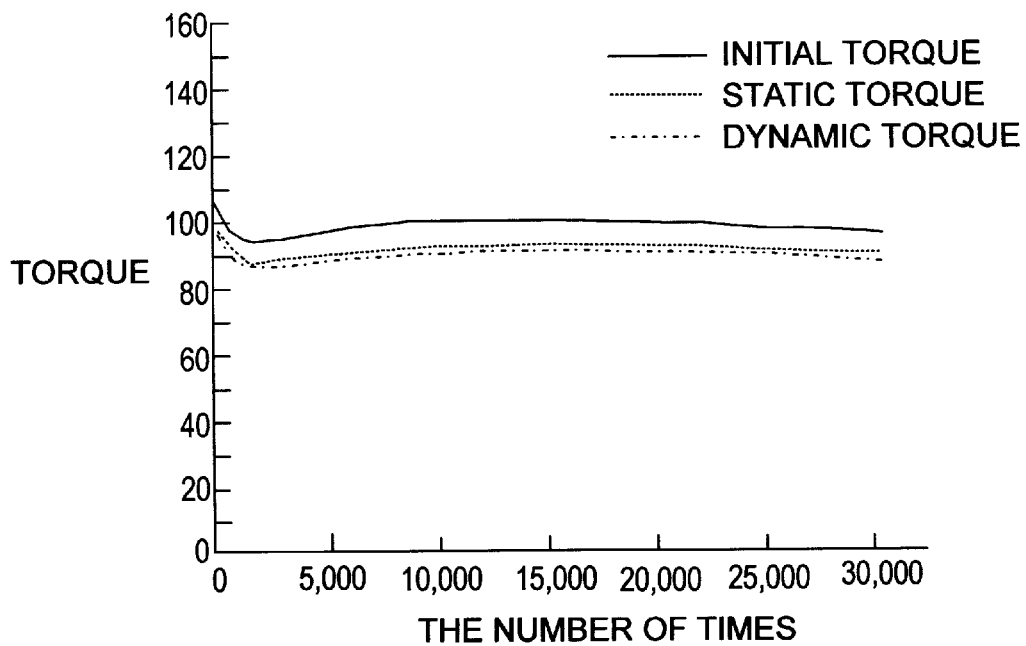
FIG. 16 shows a graph showing the variation of the torque in the present invention.

FIG. 13 shows the variation of the torque measured in a test in which the open/close member is opened and closed over 30,000 times by using the friction plates which do not have the recesses. The experiment has been made by using the white color solid lubricant and the friction plates made of stainless and phosphor bronze wherein the diameter of the friction plates is 8 mm and the diameter of the aperture receiving the shaft is 4 mm. FIG. 14 shows the variation of the torque measured in a test in which the same parameters as that in FIG. 3 are used except that penetrating apertures are formed in the friction plates. FIG. 15 shows the variation of the torque measured in a test in which the same parameters as that in FIG. 3 are used except that closed type recesses without the inclination of the side walls ($\theta=90$ degrees) are formed on the friction plates. FIG. 16 shows the variation of the torque measured in a test in which the same parameters as that in FIG. 3 are used except that the closed type recesses with the inclination of the side walls ($\theta=70$ degrees) are formed on the friction plates.

The friction plates used in the experiments shown in FIGS. 14–16 are formed with the same number of penetrating apertures or the non-penetrating apertures as that shown in FIG. 10 at the same positions as the positions of the non-penetrating apertures shown in FIG. 10. The torque hinge, in which the variation of the torque curve with the increase of the number of times of the open/close operation is small, and the difference between the initial torque and the dynamic torque is small, can be classified as an excellent torque hinge. In the cases of the friction plates without the recesses in FIG. 13, the friction plates with the penetrating apertures in FIG. 14, the value of the torque is remarkably varied with the increase of the number of times of the open/close operation, and the difference between the initial torque and the dynamic torque is large. In the cases of the friction plates with the recesses in FIGS. 15 and 16, the value of the torque varied little with the increase of the number of times of the open/close operation, and in the case of the friction plates with the tapered recesses in FIG. 16, the difference between the initial torque and the dynamic torque is substantially small.

The present invention realizes the torque hinge mechanism in which the operation is made smooth, the mechanism can be stably fixed at any angle, and the lubricant can be stably held over a long period of time. Since the supply of the lubricant is rapidly made, it is possible to keep the initial torque to a low level and to keep the abrasion of the friction surfaces to a minimum. Further, since the supply of the lubricant to the large area of the friction plates is rapidly made, it is possible to decrease the pressure onto the surface which is required to generate the required torque and to keep the abrasion of the friction surfaces to a minimum.

While the invention has been particularly shown and described with respect to preferred embodiments thereof, it should be understood by those skilled in the art that the foregoing and other changes in form and detail may be made therein without departing from the spirit and scope of the invention as defined in the appended claims.

What is claimed:

1. A torque hinge mechanism comprising:

a shaft; and at least two ring like friction plates having opposing friction surfaces pressed against each other by a pressure, and through which said shaft passes;

wherein a closed type non-penetrating recess having an inclined surface is formed on one of said opposing friction surfaces.

2. The mechanism according to claim 1, wherein a lubricant is held between said opposing friction surfaces.

3. The mechanism according to claim 1, wherein a plurality of said closed type non-penetrating recesses are formed on at least one of said friction surfaces.

4. The torque hinge mechanism according to claim 1, wherein said non-penetrating recess has an elongated shape with a long axis extending along a radial direction of said ring like friction plate.

5. The torque hinge mechanism according to claim 4, wherein a shape of a portion, adjacent to an outer side of said ring like friction plate, of said elongated shape has a substantially same shape as the shape of a portion, adjacent to an inner side of said ring like friction plate, of said elongated shape.

6. The torque hinge mechanism according to claim 1, wherein said non-penetrating recess is a perfectly closed type non-penetrating recess.

7. An apparatus comprising:

a main body;

a open/close member;

and at least two torque hinge mechanisms for coupling said main body with said open/close member;

wherein said torque hinge mechanism comprises:

a shaft; and at least two ring like friction plates pressed against each other by a pressure, and through which said shaft passes;

wherein a closed type non-penetrating recess having an inclined surface is formed on a friction surface of one of said at least two ring like friction plates, said closed type non-penetrating recess holding a lubricant.

8. The apparatus according to claim 7, wherein said apparatus is a portable type information processing terminal apparatus.

9. The apparatus according to claim 8, wherein said open/close member is an image displaying device.

10. The apparatus according to claim 9, wherein said apparatus is a notebook type personal computer.

11. The apparatus according to claim 10, wherein said open/close member is a liquid crystal display device.

12. The apparatus according to claim 9, wherein said torque hinge mechanism is electrically conductive.

* * * * *